(12) United States Patent
Anderson et al.

(10) Patent No.: US 12,121,936 B1
(45) Date of Patent: Oct. 22, 2024

(54) PROCESSING SYSTEM FOR HANDLING PIECES OF PRODUCT

(71) Applicant: General Mills, Inc., Minneapolis, MN (US)

(72) Inventors: Benjamin Francis Anderson, Delaware, OH (US); Emil Bogdanov, Excelsior, MN (US); Alexander August Giesige, New Marshfield, OH (US); Ralph A. Stenvik, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 18/204,078

(22) Filed: May 31, 2023

(51) Int. Cl.
*B07C 5/36* (2006.01)
*B07C 5/10* (2006.01)
*B07C 5/342* (2006.01)

(52) U.S. Cl.
CPC ............ *B07C 5/362* (2013.01); *B07C 5/10* (2013.01); *B07C 5/342* (2013.01); *B07C 2501/0081* (2013.01)

(58) Field of Classification Search
CPC ... B07C 5/10; B07C 5/342; B07C 2501/0081; B65G 47/082; B65G 47/22; B65G 47/53; B65G 54/02
USPC ...................................................... 209/580
See application file for complete search history.

(56) References Cited

U.S. PATENT DOCUMENTS

| | | |
|---|---|---|
| 6,784,572 B1 | 8/2004 | Backman et al. |
| 6,876,107 B2 | 4/2005 | Jacobs |
| 7,026,732 B1 | 4/2006 | Backman et al. |
| 9,882,520 B2 | 1/2018 | Huber et al. |
| 9,999,906 B2 * | 6/2018 | Stockard ................. B07C 5/368 |
| 10,029,855 B2 | 7/2018 | Grosskreuz et al. |
| 10,106,331 B2 | 10/2018 | Radak et al. |
| 10,220,862 B2 | 3/2019 | Huber et al. |
| 10,239,418 B2 | 3/2019 | Cromheecke et al. |
| 10,243,441 B2 | 3/2019 | Jacobs et al. |
| 10,246,266 B2 | 4/2019 | Weber et al. |
| 10,261,491 B1 | 4/2019 | Dunham et al. |
| 10,370,195 B2 | 8/2019 | Huber |
| 10,454,355 B2 | 10/2019 | Weber et al. |
| 10,532,891 B2 | 1/2020 | Walter et al. |
| 10,585,145 B2 | 3/2020 | Shirazi et al. |
| 10,608,518 B2 | 3/2020 | Brucker et al. |
| 10,618,750 B2 | 4/2020 | Brucker et al. |

(Continued)

FOREIGN PATENT DOCUMENTS

WO    WO 2019/011516    1/2019

*Primary Examiner* — Michael McCullough
*Assistant Examiner* — Jessica L Burkman
(74) *Attorney, Agent, or Firm* — Jordan IP Law LLC; Rachel A. Kahler

(57) ABSTRACT

A processing system for packaging pieces of product utilizing high-speed sorting includes an infeed conveyor for supplying the pieces of food product and a linear motor sorter is connected to the infeed conveyor. The sorter includes a main conveyor with several lanes for moving the pieces of food product, with one of the lanes being a first lane which receives the pieces of food product. The sorter also has one or more diverters for diverting determined ones of the pieces of food product from the first lane to at least one other lane. The sorter includes a linear motor and carts connected to the linear motor and is configured to move the pieces of food between the lanes.

20 Claims, 4 Drawing Sheets

(56) References Cited

U.S. PATENT DOCUMENTS

| | | |
|---|---|---|
| 10,686,356 B2 | 6/2020 | Sommerhalter, Jr. |
| 10,826,370 B2 | 11/2020 | Huber et al. |
| 10,829,317 B2 | 11/2020 | Wernersbach et al. |
| 10,848,047 B2 | 11/2020 | Weber et al. |
| 10,858,192 B2 | 12/2020 | Neufeld et al. |
| 10,906,748 B2 | 2/2021 | Ozimek et al. |
| 10,913,362 B2 | 2/2021 | Holzleitner et al. |
| 10,917,027 B2 | 2/2021 | Weber et al. |
| 10,923,997 B2 | 2/2021 | Hoeck et al. |
| 10,967,892 B2 | 4/2021 | Cooper et al. |
| 10,978,969 B2 | 4/2021 | Weber et al. |
| 10,983,508 B2 | 4/2021 | Klein, II |
| 10,985,685 B1 | 4/2021 | Sun et al. |
| 10,994,943 B2 | 5/2021 | Huber et al. |
| 11,021,335 B2 | 6/2021 | Sinzenich et al. |
| 11,070,153 B2 | 7/2021 | Van Dorpe et al. |
| 11,091,328 B2 | 8/2021 | Haya |
| 11,104,524 B2 | 8/2021 | Wernersbach et al. |
| 11,161,701 B2 | 11/2021 | Weber |
| 11,190,086 B2 | 11/2021 | Grosskreuz et al. |
| 11,251,575 B2 | 2/2022 | Meghpara et al. |
| 11,303,242 B2 | 4/2022 | Sun et al. |
| 11,312,403 B2 | 4/2022 | Wernersbach et al. |
| 11,344,900 B2 | 5/2022 | Neufeld et al. |
| 11,352,223 B2 | 6/2022 | Borchardt et al. |
| 11,429,087 B2 | 8/2022 | Zehnder et al. |
| 11,512,739 B1 | 11/2022 | Gardner et al. |
| 11,713,147 B2 * | 8/2023 | Duperray ................ B65B 21/18 |
| | | 198/469.1 |
| 11,878,829 B2 * | 1/2024 | McLenithan ........... B65B 39/14 |
| 2016/0218608 A1 | 7/2016 | Floresta |
| 2016/0232656 A1 * | 8/2016 | Taylor .................. B07C 5/3422 |
| 2020/0048016 A1 | 2/2020 | Sinzenich et al. |
| 2021/0046826 A1 | 2/2021 | Prüssmeier et al. |
| 2021/0155422 A1 | 5/2021 | Kastinger et al. |
| 2021/0159834 A1 | 5/2021 | Schönke et al. |
| 2021/0167713 A1 | 6/2021 | Kaufleitner et al. |
| 2021/0237981 A1 | 8/2021 | Huber et al. |
| 2021/0402881 A1 | 12/2021 | Hanis et al. |
| 2022/0204284 A1 | 6/2022 | Ganesan et al. |
| 2022/0324663 A1 | 10/2022 | Seal et al. |
| 2022/0380148 A1 | 12/2022 | Karolus et al. |
| 2022/0411196 A1 | 12/2022 | Das et al. |
| 2023/0015917 A1 | 1/2023 | Achterberg et al. |

* cited by examiner

PROCESSING SYSTEM FOR HANDLING PIECES OF PRODUCT

FIELD OF THE INVENTION

The present invention relates to automated product handling systems employing linear transport systems for merging or dividing product streams.

BACKGROUND OF THE INVENTION

In the manufacturing setting, automated package handling systems are commonly employed. In the food industry, automated packing is widely used in connection with overall processing systems for a wide range of food products. For instance, as partially or fully prepared frozen food products last a long time when kept at appropriate storage temperatures, packaging these and other food products with their storage requirements in mind can be important. However, packaging large quantities of food products in a fast and efficient manner presents challenges. Considering the production of frozen food products, frozen food products are initially prepared employing various cooking methods. After initial preparation and freezing, many frozen food products are packaged in a line of processing machines. Packaging frozen food products rapidly and on a large scale can be difficult since many different versions of the food product are typically processed on the same line. Often, the processing line will have to sort the frozen food products to have the frozen food products placed in the correct type of packaging. For example, the size and labeling of the packaging should match the frozen food products placed in the packaging. In addition, if certain products are defective, they need to be removed from the processing line before packaging.

Frozen pizza is an example of a frozen food product processed in a packaging line. Such a packaging line may include a wrapping machine, a sorting machine and a packaging machine. Once a frozen pizza has been prepared, the pizza is first processed by the wrapping machine, where the pizza is enclosed in a film, and then conveyed to the sorting machine.

The sorting machine, or sorter, may be an activated roller belt machine or conveyor that is able to move a whole or pieces of pizza along various lanes traversing the machine. Such a machine is commercially available from Intralox corporation. For example, pieces are sorted based on properties of each piece, e.g., defective pizza pieces may be placed in a reject lane, while pizzas with pepperoni would go to a lane connected to a machine packaging the pieces in boxes having a pepperoni label. In a corresponding manner, pizzas with sausage would go to a lane connected to a machine packaging the pieces in boxes with a sausage label.

While an activated roller belt machine is mentioned as an example, other linear track technologies have been employed as sorters. Such linear track devices have chain or drive-linked movers, so these devices only work effectively when objects on a lane are provided at a constant speed, with constant spacing, and have no ability to selectively engage different pieces based on any desired criteria. Thus, "selection" in current systems, can really only be categorized as "success" or "failure." For example, if an item is spaced incorrectly, a current system will simply fail to engage the item. This deficiency limits the ability of the linear track devices to diverge objects from one lane to multiple lanes and to converge objects from multiple lanes to one lane. This deficiency also therefore limits the ability of linear track devices to sort items. Perhaps more importantly, such known machines are slow and cannot move pieces of product from one lane to another if the pieces are connected. For example, such pieces could become connected if the wrapping machine fails to properly cut the film between two pizzas and mistakenly wraps multiple pieces of pizza in one package.

Continuing with the frozen pizza example, once pizza pieces pass the sorter, the pieces are sent to the packaging machine to be placed in cartons. Such packaging machines are often called case packers as represented by a commercially available case packer from the PAAL corporation based in Germany, with this case packer functioning to move products along a conveyor and then place the products in boxes or other containers.

As can be seen from the above discussion, the known linear track technologies are simply not considered capable of processing pieces of food fast enough and are not able to move product from one lane to another in the process flow at acceptable speeds. Such an arrangement is wasteful and limits its overall use in numerous fields, including the food processing industry. There is a desire to sort products for packaging and to remove defective products as early in the process as possible so time and energy are not wasted on damaged products that will simply be discarded. Therefore, there exists a need in the art for a system that will allow for high-speed sorting of products in a packaging line, particularly using linear product transport systems.

SUMMARY OF THE INVENTION

In order to address these issues, a processing system for handling pieces of product has been set forth that allows for high-speed sorting of products. The system comprises an infeed conveyor for supplying the pieces of products. The infeed conveyor could supply any object to be sorted but may be, for example, part of a flow wrapper machine for wrapping the pieces product, such as food products, in a plastic film. A sorter is connected to the infeed conveyor. The sorter includes a main conveyor with several lanes for moving the pieces of food product from the infeed conveyor. A first or main lane receives the pieces of food product from the infeed conveyor. The sorter also has one or more diverters for diverting select product pieces between the several lanes. Each diverter includes a linear motor with carts connected to the linear motor. Preferably each diverter is situated above the several lanes and is configured to move the pieces between predetermined lanes. An output conveyer receiving the product pieces from the sorter.

The processing system has several preferred variations. The main conveyor is arranged along a longitudinal axis extending from the infeed conveyor to the output conveyor. Each diverter is located above the main conveyor and extends from a first lane of the several lanes to a second lane or target lane of the several lanes. Each diverter includes a linear motor arranged in the form of a track preferably taking an oval configuration. The bottom of the oval faces the main conveyor and the top of the oval faces away from the main conveyor. A series of carts move along the track. A control system is connected to the sorter and is configured to have the carts engage certain pieces of product by aligning the cart with a piece of product and extending a scoop downward from the cart toward the main conveyor. The cart then moves along the linear motor to move the piece of product between the lanes. Once the cart is aligned with a target lane, the controller retracts the scoop thus releasing the piece of product. Alternatively, if the target lane is constituted by a conveyor positioned at a lower level than that of the first lane, the product could simply fall onto the lower conveyor of the target lane. The piece of product is then moved along the second or target lane by the main conveyor. A second diverter, constructed in the same manner as the first diverter, is also preferably located above the main conveyor and extends from the first lane of the several lanes to different a lane than the first diverter.

The output conveyor could be any conveyor taking products away from the system. However, as an example, the output conveyor may be part of a case packer configured to receive pieces of food from the several lanes and place the pieces of food product in a type of box based on the particular lane in which each piece of food arrives at the case packer. The control system is further configured to cause the diverter to divert food between lanes based on a property sensed by a detector such as a photo detector. The control system thus ensures that the pieces of product arrive at the correct lane based on the property. The photo detector is also configured to determine the position of the pieces of product when entering the sorter. An encoder is positioned on the main conveyor for detecting a speed of the main conveyor. The controller receives both the position and speed information which is used to more accurately position the scoops of the carts to engage the product pieces.

The property detected by the photo detector can vary, but is preferably the size, color or position of the product pieces. The controller merges from multiple lanes to a lesser number of lanes or diverts the pieces from one or more lanes to two or more lanes. The sorter is arranged to perform other sorting activities. For example, the sorter preferably diverts the product pieces from a larger number of lanes to a fewer number of lanes based on the property. In another arrangement, the sorter is configured to divert the product pieces from one or more lanes to one or more different lanes based on the property.

In operation, the system preferably performs several steps including: supplying the pieces of product with an infeed conveyor; moving the product pieces along several lanes of the main conveyor of the linear motor sorter, the several lanes including a first lane; receiving the product pieces from the infeed conveyor with the first lane; diverting the product pieces between the several lanes with the diverter by having a linear motor and carts connected to the linear motor move the pieces between the lanes; and receiving the product pieces from the sorter with an output conveyor.

The method also includes engaging the product pieces with the carts, moving the carts along the linear motor, and moving the pieces between lanes. The several lanes include a first lane, a second lane, and a third lane, and the method further comprises detecting a predetermined property of the product pieces; and merging or diverting the pieces based on the detected property. The method further includes diverting the product pieces includes diverting the pieces of food product based on the size, color or position of the pieces.

Overall, the invention can be used to sort, merge, or divert objects during handling, and more particularly to identify at least one property and arrange a wide range of products in an automated packaging system based on the property using one or more linear transport systems. As such the invention could have specific application in the food industry, particularly in packaging frozen food products. In particular, in accordance with a preferred embodiment, each linear transport system is configured to divert a frozen food product travelling linearly in a first direction along an angled path into another line of travel extending in the first direction.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings.

DETAILED DESCRIPTION OF THE PREFERRED EMBODIMENTS

Figure 1:
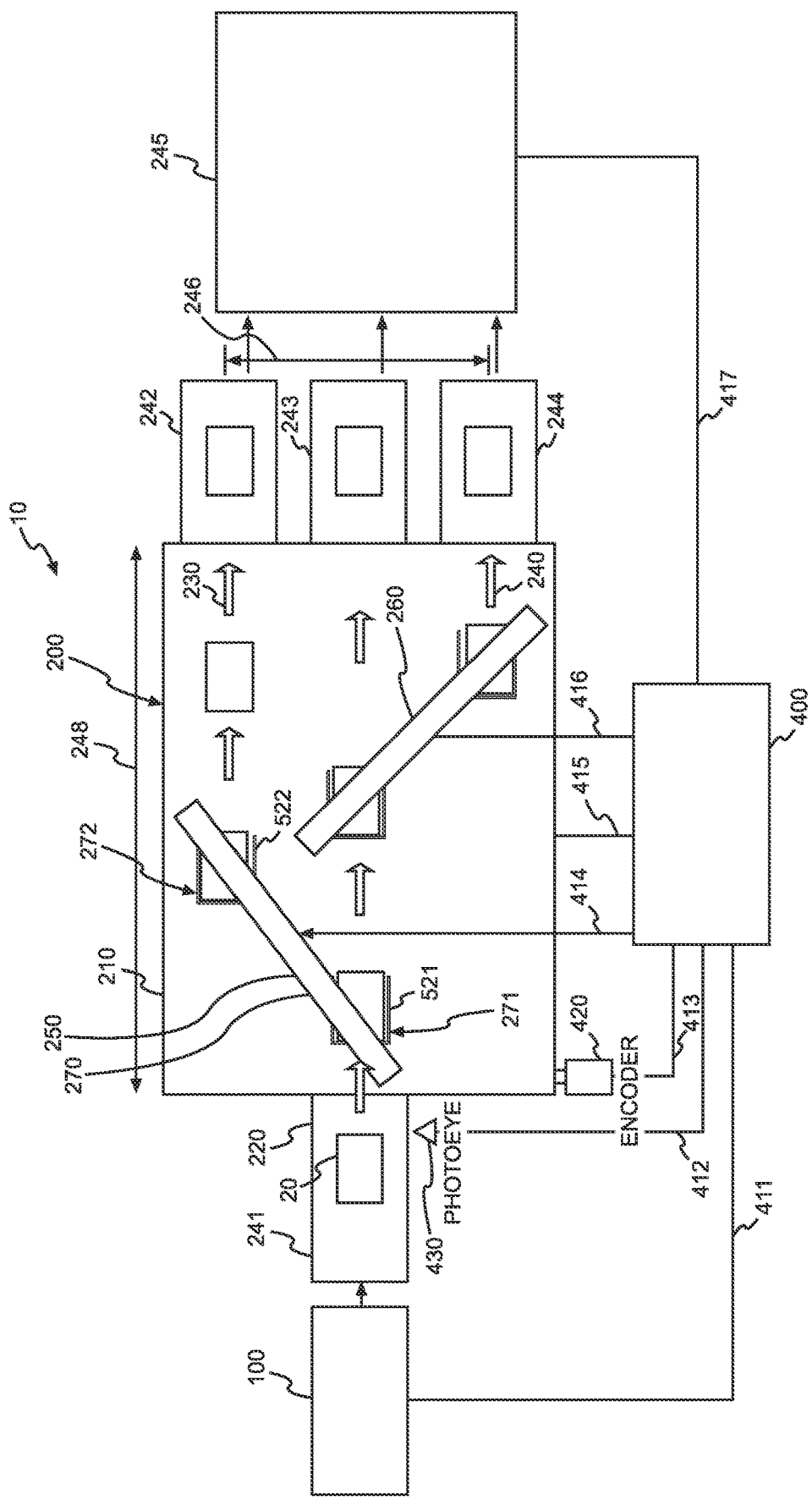
FIG. 1 shows a schematic overhead view showing a handling system including a sorter with a main conveyor and two diverters for sorting products in accordance with a preferred embodiment of the invention.

The following detailed description should be read with reference to the drawings. The detailed description and the drawings, which are not necessarily to scale, set forth illustrative and exemplary embodiments and are not intended to limit the scope of the disclosure. Selected features of any illustrative embodiment can be incorporated into an additional embodiment unless clearly stated to the contrary.

While the disclosure is amenable to various modifications and alternative forms, specifics thereof have been shown by way of example in the drawings and will be described in detail. Overall, it should be understood, the intention is not to limit aspects of the disclosure to the particular illustrative embodiments described. On the contrary, the intention is to cover all modifications, equivalents, and alternatives falling within the spirit and scope of the disclosure.

Turning now to FIG. 1, there is shown a processing system 10 for packaging pieces of product 20 allowing for high-speed sorting of the products. Processing system 10, while described with reference to food products, can be employed to process various different types of products. System 10 comprises an infeed conveyor 100 for supplying the pieces of food product 20. In general, any type of food product 20 may be supplied by the infeed conveyor 100 to be sorted by the processing system 10. However, to aid in understanding of the invention, the description of the preferred embodiments refers to frozen pizza which, once prepared, only needs to be heated before being consumed. After being prepared, the piece of frozen pizza is wrapped in plastic film. In this case, the infeed conveyor 100 may be part of a flow wrapper machine. A flow wrapper machine pushes the product along a conveyor belt, which in this case is the infeed conveyor 100. The packaging material, preferably a plastic film with a longitudinal seal on the underside, forms a tube to catch the food product 20 as the product moves along the conveyor 100. The film 'bag' is then sealed at either end with the food product 20 inside. Typically, the flow wrapper machine provides a film tightly fitting around the pizza piece. Such flow wrapper machines are commercially available, such as from the Syntegon corporation. The pizza piece, enclosed in a film, is then conveyed to the sorter 200.

The sorter 200 is connected to the infeed conveyor 100. The sorter 200 includes a main conveyor 210 with several lanes 220, 230, 240 for moving the pieces of food product 20 in the direction of the arrows. One of the several lanes 220, 230, 240, being a first lane 220, extends toward the infeed conveyor 100 and receives the pieces of food product 20. The main conveyor 210 is formed with a moving belt traveling around driving rollers, while four separate conveyors 241-244 are placed around the main conveyor 210 and are also constituted by belts driven by rollers (not separately shown). Alternatively, the main conveyor 210 can be defined by multiple conveyors arrange directly adjacent one another and traveling in the same direction, or made of numerous rollers allowing for the pieces of product 20 to be moved along the main conveyor 210, while the separate conveyors 241-244 are also employ multiple rollers. Such rollers may be placed in different orientations and are driven by the belts or by separate motors. Although the size of the conveyors can greatly vary, by way of a specific example, the main conveyor 210 could be 75-85 inches long, separating a center line of conveyors 242 and 244 by 20-30 inches.

The main conveyor 210 is arranged along a longitudinal axis 248. Two of the separate conveyors 241 and 243 are part of the first lane 220 and carry food product 20 directly from the infeed conveyor 100 to an output conveyor 245. Another conveyor 242 is in the second lane 230 and a further conveyor is in the third lane 240. The output conveyor 245 receives pieces of food product 20 from the sorter 200. The output conveyor 245 is preferably part of a case packer configured to receive pieces of food product 20 from the several lanes 220, 230, 240 and further configured to place the pieces of food product 20 in a type of box based on which lane each piece of food product 20 arrives at the case packer.

The sorter 200 also has first and second diverters 250, 260 for diverting the pieces of food product 20 between the several lanes 220, 230, 240. The first diverter 250 is located above the main conveyor 210 and extends from the first lane 220 of the several lanes 220, 230, 240 to a second lane 230 of the several lanes. The first diverter 250 includes a linear motor 270 and a first cart 271, as well as a second cart 272 connected to the linear motor 270. The carts are configured to move the pieces of food product 20 between the first lane 220 and the second lane 230, while traveling at the same or a greater speed in the direction of travel (i.e., the directional component of the cart parallel to the main conveyor) of main conveyor 210. The second diverter 260 is located above the main conveyor 210, extends from the first lane 220 to the third lane 240 of the several lanes 220, 230, 240 and is configured to move food product 20 from the first lane 220 to the third lane 240.

A control system 400 communicates with various communication lines 411-417. Control system 400 may be any computer system with a memory, a processor and an input device, such as a keyboard, mouse, touchpad or the like, and is programed to receive information from various sensors as described below. The control system 400 is connected to sorter 200 by communication line 415 and is configured to cause the carts 271, 272 to engage the pieces of product 20, move along the diverter 250 and thereby move the pieces of product 20 between the lanes 220, 230, 240.

The control system 400 preferably includes an encoder 420 on the main conveyor 210 for detecting a detected speed of the main conveyor 210. The speed is communicated to the control system 400 through line 413. The control system 400 is further configured to have the carts 271, 272 engage the pieces of food product 20 based on the detected speed of the main conveyor 210.

A photo detector 430, or photo eye, is configured to measure a property of the pieces of food product 20 entering the first lane 220. The property is preferably the arrival time of the food product 20. The detector 430 is configured to send the measured property to control system 400 through line 412. Photo detector 430 is also configured to determine the position of the pieces of food product 20 upon entering the sorter 200 and divert select pieces of food based on a detected property. The property detected by the photo detector 430 can vary, but preferably is one of size, color, arrival time, or even appearance of the pieces of food product 20. For instance, the control system 400 functions to cause the pieces of food product 20 to be diverted from one or more lanes 220 to two or more lanes 230, 240 based on the property. The control system 400 is further configured to cause the sorter 200 to divert food between lanes based on the detected property.

Figure 4:
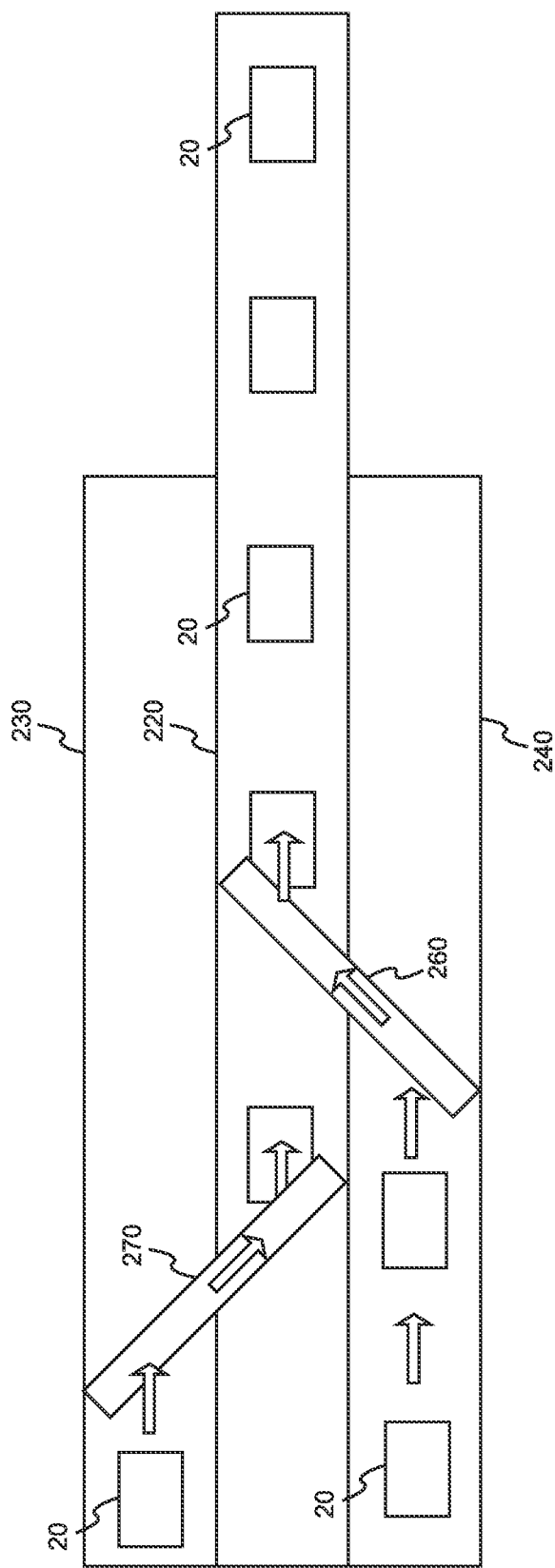
FIG. 4 shows a schematic overhead view showing a handling system merging products.

The control system 400 is quite flexible and preferably programed to have the sorter 200 perform various functions. For example, the control system 400 will have the sorter 200 divert the pieces of food product 20 from a number of lanes to a fewer number of lanes based on the property or have the sorter 200 divert the pieces of food product 20 from one or more lanes to one or more other lanes based on the property. The control system 400 is also preferably configured to employ only one diverter and only two lanes in order to sort food products. The control system 400 can also be configured to merge products from multiple lanes to one lane as shown in FIG. 4 and discussed below.

Figure 2:
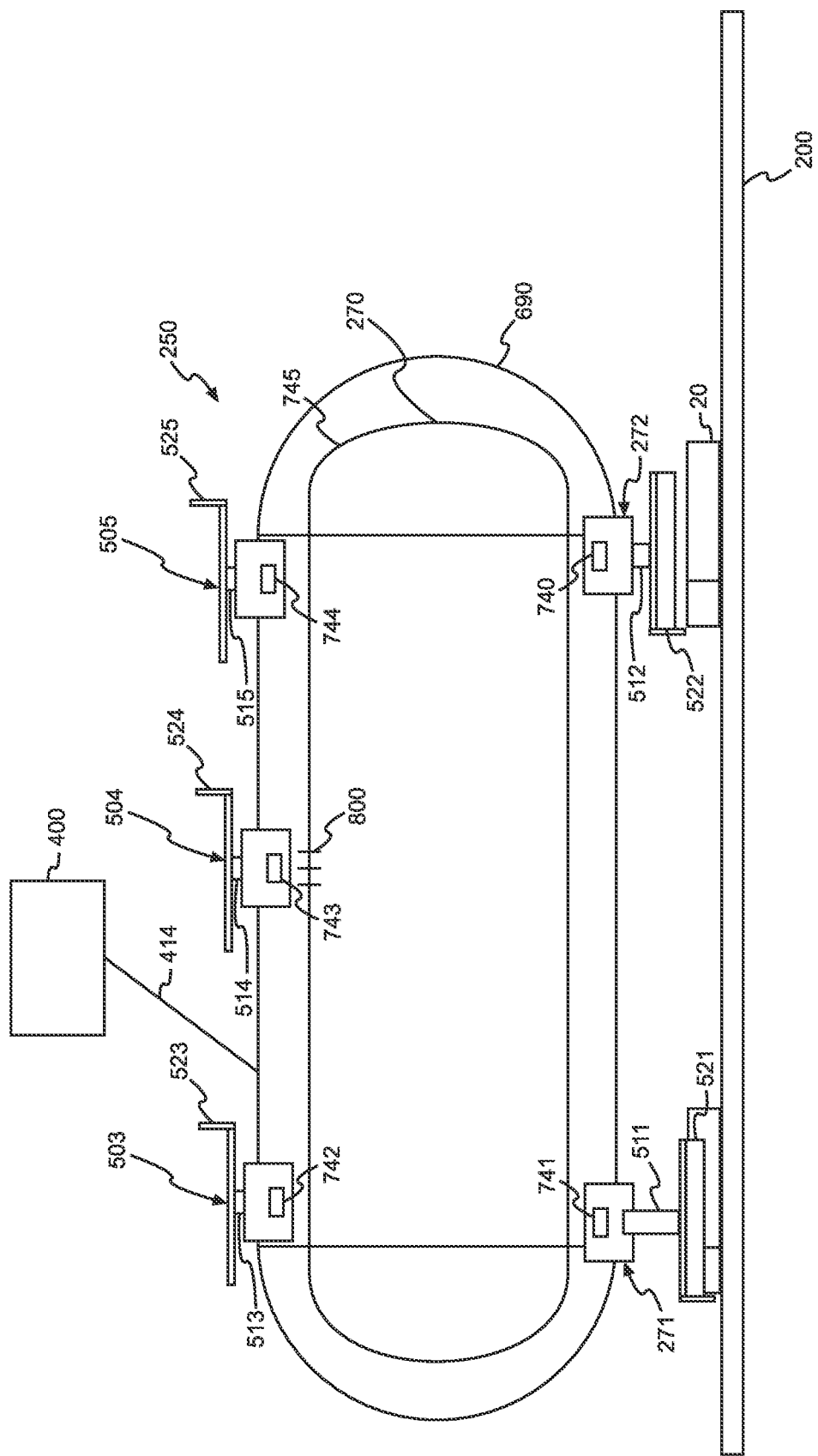
FIG. 2 shows a side view of one of the diverters of FIG. 1.

Turning to FIG. 2, a schematic side view of the first diverter 250 is shown. The first diverter has five carts 271, 272, 503, 504, and 505. Each cart has an actuator 511-515 for supporting a respective scoop 521-525 and allowing the respective scoop 521-525 to engage a piece of food product 20. Note for example actuator 511 is extended to engage pizza 20, while actuator 512 is retracted to release pizza 20. Of course, the product engaging structure can change from the example provided based on the particular product being sorted.

Figure 3:
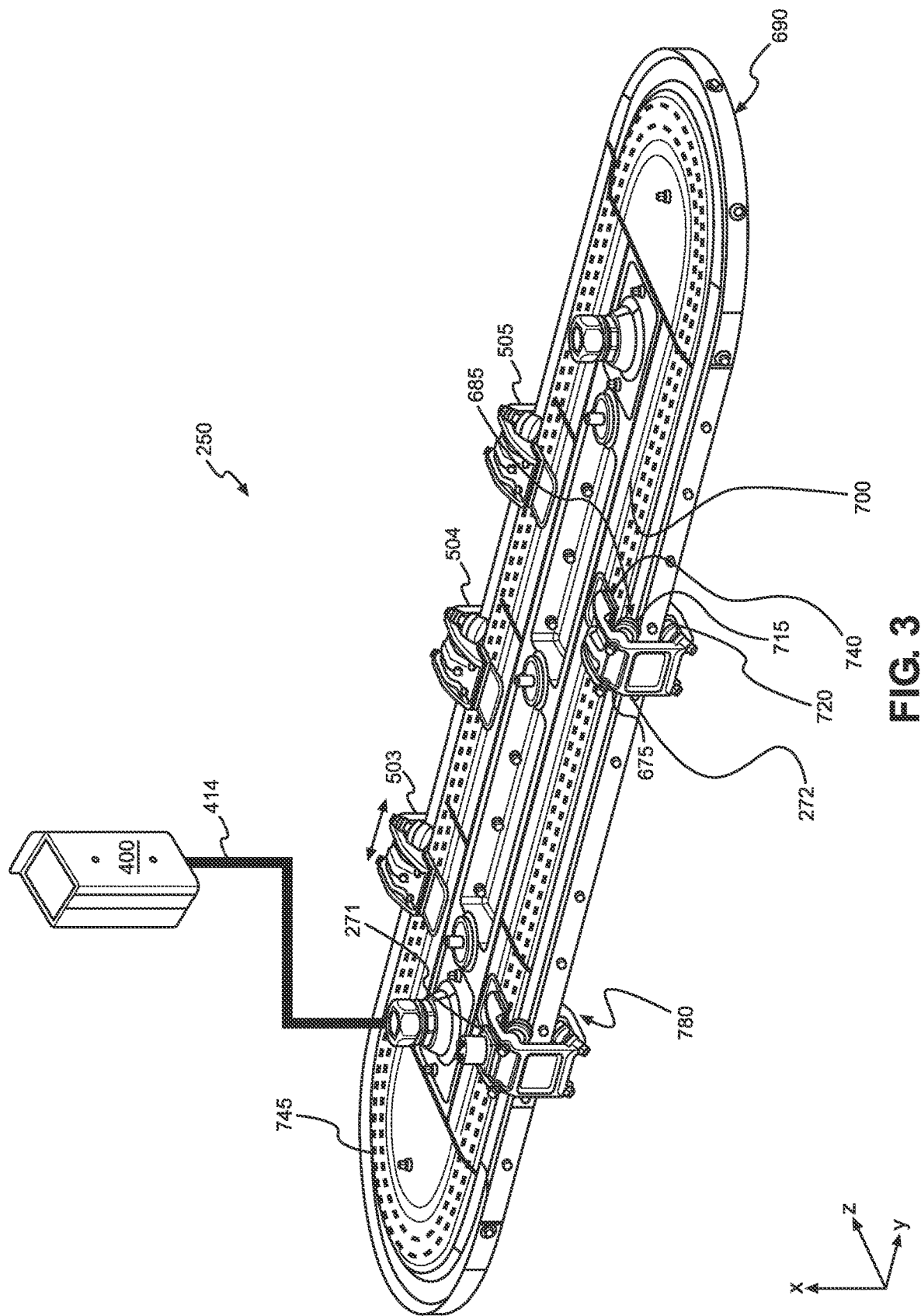
FIG. 3 shows a perspective view of the diverter of FIG. 2.

FIG. 3 shows a detailed perspective view of the first diverter 250. The carts are shown without actuators or scoops to better see how the cart 272 is connected to a support 675 and an associated guide arrangement 685. The support 675 is depicted with a horseshoe-shaped design and engages around both a running rail 690 and also an outerside section of a drive module 700. Cart 272 is positioned on the running rail 690 and the guide arrangement 685 includes a plurality of running rollers 715 which roll on the running rail 690 and allow the cart 272 to slide along the running rail 690. In addition, the drive module 700 includes a position detection device 720 which determines the position of the cart 272 on the running rail 690.

Referring back to FIG. 2, a magnet assembly 740-744 is fastened to each cart 271, 272, 503, 504, and 505. Each magnet assembly 740-744 can have one or more permanent magnets which are arranged in a row parallel in relation to the running rail 690.

The diverter 250 is preferably designed, for example, as a synchronous linear motor. In this case, coil currents which form a polyphase AC signal are generated in a set of coils 745. The number of phases of the AC signal and the mutual phase angle of the individual coil currents are determined here in accordance with the geometry of the arrangement. The control system 40 drives the coil arrangement 745 to cause a traveling field 800 to move along the running rail 690 so a force is directed along the coil arrangement 745 and exerted onto the cart 504 by the interaction of the magnet arrangement 740-744 with the magnetic traveling field 800 created by the coil currents. The magnet assembly 740-744 couples to the traveling field 800, and each cart 271, 272, 503, 504, and 505 is carried along the running rail 690 by the traveling field 800. The running rail 690 is made up of a number of segments, and the control system 400 directs operation of the carts 271, 272, 503, 504 and 505, causing the carts 271, 272, 503, 504 and 505 to travel along the running rail 690.

As best seen in FIG. 3, the coil arrangement 745 is arranged in the housing 780. When the invention is employed in the food industry, the housing 780 is preferably made of a food-grade material, such as stainless steel, plastic, polyethylene, or polytetrafluoroethylene, with the housing 780 having a substantially smooth design, allowing for any food accumulation to be easily removed. More details of the linear transport system can be found in U.S. Pat. No. 11,021,335, incorporated herein by reference.

FIG. 4 shows an embodiment wherein the sorter, which includes inner lane 220 and outer lanes 230 and 240, is arranged to merge the product pieces 20. The sorter in FIG. 4 employs analogous components to those in the sorter shown in FIG. 1. For example, the same diverter 260 is employed as described with regard to FIGS. 1-3 but is now arranged to move product pieces from outer lane 240 to middle lane 220, thus merging the products. Another diverter 270 is shown arranged to move product pieces from outer lane 230 to middle lane 220. While not shown, it is understood that control system 400 is connected to the components shown in a manner corresponding to that discussed for FIG. 1. The structure of the individual components is also the same as described above and therefore the description will not be repeated here.

In operation, system 10 performs several steps including: supplying the product pieces 20 with the infeed conveyor 100; and moving the product pieces 20 along several lanes 220, 230, 240 of the main conveyor 210 of the sorter 200. The method further includes receiving the pieces of product 20 from the infeed conveyor 100 with the first lane 220; diverting the pieces of product 20 between the several lanes 220, 230, 240 with the diverter 250 by having a linear drive module 700 and carts 271, 272, 503, 504 and 505 connected to linear drive module 700 move the pieces of product between the lanes 220, 230, 240; and receiving the pieces of product 20 form the sorter 200 with the output conveyor 245.

The method also includes engaging the pieces of product 20 with the carts 271, 272, 503, 504 and 505, moving the carts 271, 272, 503, 504 and 505 along the linear drive module 700, and moving the pieces of product 20 between lanes 220, 230, 240. The method further comprises detecting a property of the pieces of product 20 and diverting the pieces of product 20 based on the detected property. Diverting the pieces of product 20 preferably includes diverting the pieces 20 based a property of the product, such as size, color and/or weight of the pieces. As shown in FIG. 4, the diverting method also encompasses merging pieces of product 20.

As can be seen from the above discussion, there is disclosed a system for that will allow for high-speed sorting of products in a packaging line, with the system being preferably applicable for sorting/packaging food products. Although described with reference to preferred structure and operation, it should be recognized that numerous changes could be made to the system. For example, while the primary use of the detector is to determine the timing of the arriving packages so that the scoops can engage properly with the packages, the detector could also be used to identify the length of the objects. An additional camera may be added to identify the objects and perform sorting. Additional photo detectors may be employed to determine product spacing and properties. The sensors may be spaced at fixed positions along the running rail and/or on the carts to provide information about the position and speed of the carts. In addition, linear track technologies may employ motion control systems utilizing independent carts and linear motors used in a wide variety of processes (e.g., packaging, manufacturing, and machining) and can provide an advantage over conventional conveyor belt systems with enhanced flexibility, extremely high-speed movement, and mechanical simplicity.

The invention claimed is:

1. A processing system for sorting pieces of product comprising:
   an infeed conveyor for supplying the pieces of product;
   a sorter connected to the infeed conveyor and including a main conveyor having several lanes for moving the pieces of product, one of the several lanes being a first lane receiving the pieces of product and a diverter for diverting the pieces of product between the several lanes, said diverter including a linear motor and carts connected to the linear motor configured to move the pieces of product between the several lanes; and
   an output conveyor receiving the pieces of product from the sorter.

2. The processing system according to claim 1, wherein the main conveyor is arranged along a longitudinal axis and the diverter is located above the main conveyor and extends from a first lane of the several lanes to a second lane of the several lanes.

3. The processing system according to claim 2, further comprising a control system connected to the sorter and configured to have the carts engage the pieces of product, move in a direction angled to infeed conveyor to move the pieces of product between the several lanes.

4. The processing system according to claim 3, wherein the diverter constitutes a first diverter and the sorter further includes a second diverter located above the main conveyor and extending from the first lane of the several lanes to a third lane of the several lanes.

5. The processing system according to claim 4, further comprising a detector including a sensor for detecting a property of the pieces of product entering the first lane.

6. The processing system according to claim 5, wherein the control system is further configured to cause the diverter to divert between lanes based on the detected property.

7. The processing system according to claim 6, wherein the output conveyor is configured to receive pieces of product from the several lanes and process the pieces of product based on which lane each piece of product arrives at a case packer.

8. The processing system according to claim 5, wherein the sensor is a photo detector configured to determine a position of the pieces of product when entering the sorter and the control system is further configured to engage with the pieces of product based on the position.

9. The processing system according to claim 5, wherein the property detected by the sensor is one of a size, color or position of the pieces of product.

10. The processing system of claim 9, wherein the sorter is configured to divert the pieces of product from one or more lanes to two or more lanes based on the property.

11. The processing system of claim 9, wherein the sorter is configured to divert the pieces of product from a number of lanes to a fewer number of lanes based on the property.

12. The processing system of claim 9, wherein the sorter is configured to divert the pieces of product from one or more to a higher number of lanes based on the property or merging from two or more to a fewer number of lanes based on the property.

13. The processing system according to claim 1, wherein the system further includes an encoder on the main conveyor for detecting a detected speed of the main conveyor, wherein the carts are caused to engage the pieces of product based on the detected speed of the main conveyor.

14. The processing system according to claim 13, wherein the product is frozen food and the infeed conveyor is part of a packaging machine.

15. A method of processing pieces of product with a linear motor sorter including a main conveyor and a diverter having carts connected to a linear motor, said method comprising:
    supplying the pieces of product with an infeed conveyor;
    moving the pieces of product along several lanes of the main conveyor of the linear motor sorter, the several lanes including a first lane;
    receiving the pieces of product from the infeed conveyor to the first lane;
    diverting the pieces of product between the several lanes with the diverter by having carts connected to the linear motor move the pieces of product between the lanes; and
    receiving the pieces of product form the sorter with an output conveyor.

16. The method according to claim 15, wherein diverting the pieces of product between the several lanes with the diverter includes:
    engaging the pieces of product with the carts;
    moving the carts along the linear motor at an angle to a direction of the main conveyor; and
    moving the pieces of product from the first lane to another one or more of the several lanes.

17. The method according to claim 16, further comprising:
    detecting a property of the pieces of product; and
    diverting the pieces of product based on the property.

18. The method according to claim 17, wherein the product is frozen food, said method further comprising:
    placing the pieces of food in a box with a case packer based on a lane of the several lanes the pieces of food arrive at the case packer.

19. The method according to claim 17, wherein diverting the pieces of product includes diverting the pieces of product based on a size, color or weight of the pieces of product.

20. The method according to claim 17, wherein diverting the pieces of product includes diverting the pieces of product a number of lanes to a fewer number of lanes or to a higher number of lanes based on the property or merging from two or more to a fewer number of lanes based on the property.

* * * * *